(12) United States Patent
Li (10) Patent No.: US 7,331,567 B2
(45) Date of Patent: Feb. 19, 2008

(54) COUPLING DEVICE FOR TWO CONNECTING POLES

(76) Inventor: Hongze Li, Xiamen Suntop Display System Inc., Caitang Industry Area, Huli district, Xiamen (CN) 361000

( * ) Notice: Subject to any disclaimer, the term of this patent is extended or adjusted under 35 U.S.C. 154(b) by 202 days.

(21) Appl. No.: 11/327,568

(22) Filed: Jan. 6, 2006

(65) Prior Publication Data

US 2007/0170406 A1 Jul. 26, 2007

(51) Int. Cl.
*B66F 3/02* (2006.01)
*F16M 13/00* (2006.01)
*B61D 45/00* (2006.01)

(52) U.S. Cl. .................. 254/95; 248/354.6; 248/354.7; 410/151

(58) Field of Classification Search .................. 254/95; 410/151; 267/147; 175/55, 56; 248/354.6, 248/354.7
See application file for complete search history.

(56) References Cited

U.S. PATENT DOCUMENTS

| | | | | |
|---|---|---|---|---|
| 5,028,185 A | * | 7/1991 | Shannon | 410/151 |
| 5,099,539 A | * | 3/1992 | Forester | 15/144.3 |
| 5,314,157 A | * | 5/1994 | Linnepe et al. | 248/354.1 |
| 5,988,963 A | * | 11/1999 | Shiau | 410/151 |
| 6,079,703 A | * | 6/2000 | Chavez, Jr. | 269/147 |
| 6,145,813 A | * | 11/2000 | Anderson | 254/418 |
| 6,176,468 B1 | * | 1/2001 | Boulanger | 254/108 |
| 6,186,715 B1 | * | 2/2001 | Oliviero | 410/151 |
| 6,247,882 B1 | * | 6/2001 | Huang | 410/151 |
| 6,543,966 B2 | * | 4/2003 | White | 405/232 |
| 6,581,911 B1 | * | 6/2003 | Scott | 254/100 |
| 6,698,984 B1 | * | 3/2004 | Chen | 410/151 |
| 6,820,842 B1 | * | 11/2004 | Chuang | 248/125.8 |

\* cited by examiner

*Primary Examiner*—Joseph J. Hail, III
*Assistant Examiner*—Alvin J Grant
(74) *Attorney, Agent, or Firm*—Greer, Burns & Crain, Ltd.

(57) ABSTRACT

A coupling device for two connecting poles which includes: a lower fixing sleeve sleeved on the upper portion of a lower connecting pole, having an opening communicating the outer surface and the inner surface of the lower fixing sleeve, two fixed plates extend outwards from the edge of the opening; an upper fixing sleeve having a through gap, two fixing plates extend outwards from the gap, the fixing plates of the upper fixing sleeve are disposed within the lower fixing sleeve, the fixing plates including releasing portions and locking portions; a controlling member rotatably connected to the lower fixing sleeve, including a central portion and two side portions, the inner side surfaces of the two side portions contacting the outer side surfaces of the two releasing portions.

4 Claims, 7 Drawing Sheets

COUPLING DEVICE FOR TWO CONNECTING POLES

FIELD OF THE INVENTION

The present invention generally relates to a coupling device, in particular, to a coupling device for two connecting poles.

BACKGROUND OF THE INVENTION

A existing coupling device for two connecting poles often includes: a lower fixing sleeve sleeved on the upper portion of a lower connecting pole; a upper fixing sleeve sleeved on the lower portion of a upper connecting pole; the upper fixing sleeve can be sleeved into the lower fixing sleeve; screws and welding technology are often used to connect the upper fixing sleeve and the lower fixing sleeve. The upper connecting pole is slidably connected to the lower connecting pole. The disadvantages of the existing technology are as follow: firstly, it takes much time and labor to assemble the device; secondly, the connections are not secure; thirdly, the screws used to connect the upper fixing sleeve and the lower fixing sleeve are easy to break; fourthly, welding takes much time.

A need therefore exists for a coupling device for two connecting poles that eliminates the above described disadvantages and problems.

BRIEF SUMMARY OF THE INVENTION

The present invention provides a coupling device for two connecting poles. The purpose of the present invention is to eliminate the disadvantages and problems described above, and provide a coupling device of simple structure, secure connections and easy assembly for two connecting poles.

The present invention adopts the following technology:

A coupling device comprising:

A lower fixing sleeve sleeved on the upper portion of the lower connecting pole, having a through opening communicating with the outer surface and the inner surface of the lower fixing sleeve, two fixed plates extend outwards from the edge of the the opening;

An upper fixing sleeve sleeved on the lower portion of the upper connecting pole, having a through gap communicating with the outer surface and the inner surface of the upper fixing sleeve, two fixing plates extend outwards from the edge of the gap, the fixing plates of the upper fixing sleeve is disposed within the opening of the lower fixing sleeve; the fixing plates including a releasing portion in the top portion and a locking portion beneath the releasing portion, the horizontal distance from the outer side surface of the locking portion to the edge of the gap is bigger than the horizontal distance from the outer side surface of the releasing portion to the edge of the gap;

A controlling member rotatably connected between the fixed plates of the lower fixing sleeve, including a central portion and two side portions at both sides of the central portion, among the two side portions and the central portion there forms a space for receiving a portion of the two fixing plates, the inner side surfaces of the two side portions keep in touch with the outer side surfaces of the two releasing portions;

The upper fixing sleeve includes at least a rack grafted to the outer side surfaces of the fixing plates; and The perimeters of the two side portions of the controlling member are of gears that match the at least a rack beside the fixing plates.

Preferably, the upper fixing sleeve may include two racks that are respectively grafted to the outer side surfaces of the two fixing plates, the perimeters of the two side portions of the controlling member are of gears that match the two racks grafted to the fixing plates. The said fixing plate further includes a raised portion beneath the locking portions.

The horizontal distance between the inner side surfaces of the said side portions equals the horizontal distance between the outer side surfaces of the said releasing portions.

A coupling device for two connecting poles further includes a fastening device which includes a clip secured between the two fixing plates and a fastener secured to the lower portion of the handle. The clip and the fastener match each other.

A coupling device for two connecting poles still further includes a handle which can be slidably connected to the controlling member. The said fastener is secured to the lower portion of the handle.

Steps of securing a coupling device are as follow: adjusting the relative position of the upper connecting pole and the lower connecting pole to ensure the upper connecting pole and the lower connecting pole are in suitable height; rotating the handle and that is to rotate the controlling member, when this step is proceeding, the upper fixing sleeve slides upwards under the force caused by the coordinate movement of the gears and the racks of the controlling member; the two faxing plates of the upper fixing sleeve slides upwards in connection with the upper fixing sleeve, thus the locking portions are pressed inwardly by the side portions of the controlling member , therefore the gap of the upper fixing sleeve becomes smaller; the gap of the upper fixing sleeve becomes smaller, which makes the upper fixing sleeve be firmly sleeved on the upper connecting pole. The releasing steps are opposite to the securing steps.

Compared to existing technology, the present invention has the following advantages: firstly, the present invention is of simple structure, secure connections and easy assembly; secondly, the upper connecting pole is adjustable.

BRIEF DESCRIPTION OF THE DRAWINGS

The present invention will be described with greater specificity and detail through the use of the accompanying drawings, in which.

DETAILED DESCRIPTION OF THE PREFERRED EMBODIMENTS

Embodiment 1

Figure 3:
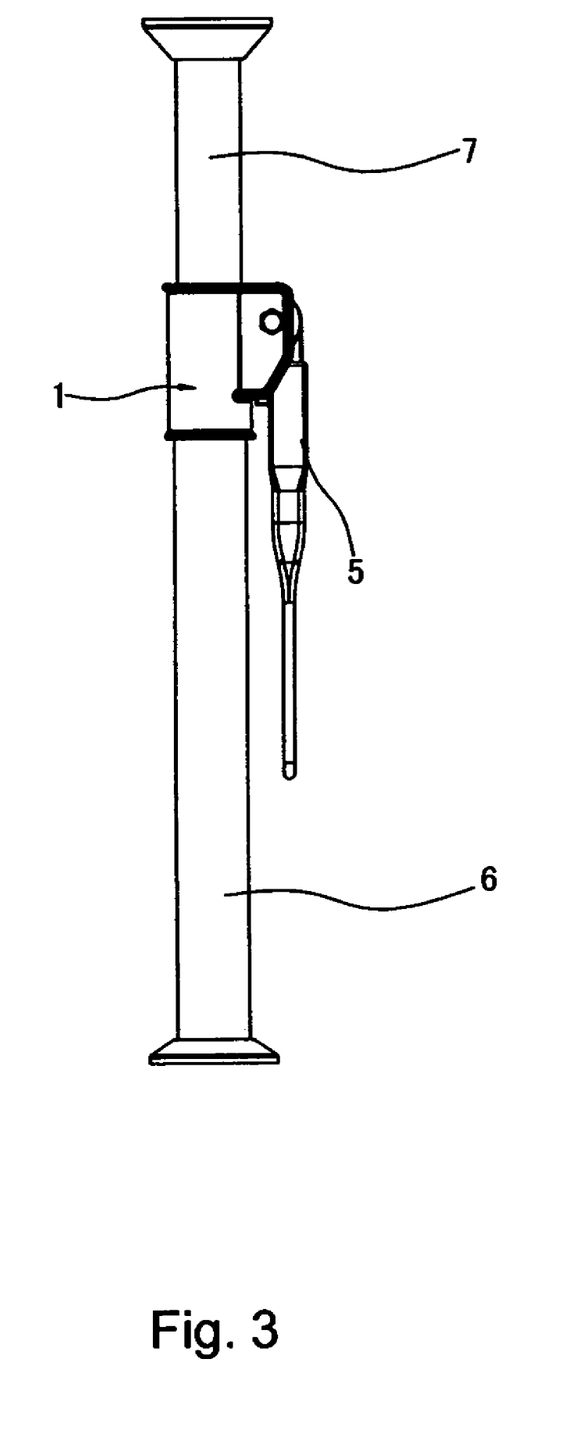
FIG. 3 is a side view of the coupling device for two connecting poles shown in FIG. 1, illustrating the coupling device in use.

With reference to FIG. 3, a coupling device includes a lower fixing sleeve 1, an upper fixing sleeve 2, a controlling member 3, a fastening device 4 and a handle 5.

With reference to FIG. 3, an upper connecting pole 7 is slidably sleeved to a lower connecting pole 6. The upper end of the upper connecting pole 7 and the lower end of the lower connecting pole 6 respcetively has a rubber foot which provides the friction that prevents the whole apparatus from sliding.

The lower fixing sleeve 1 is securely sleeved about the upper end of the lower connecting pole 6. The lower fixing sleeve 1 includes a open 11 from two edges of which two fixed plates 12 extend outwards from the outer surface of the lower fixing sleeve 1. A convex ring is set inside the lower fixing sleeve 1.

Figure 1:
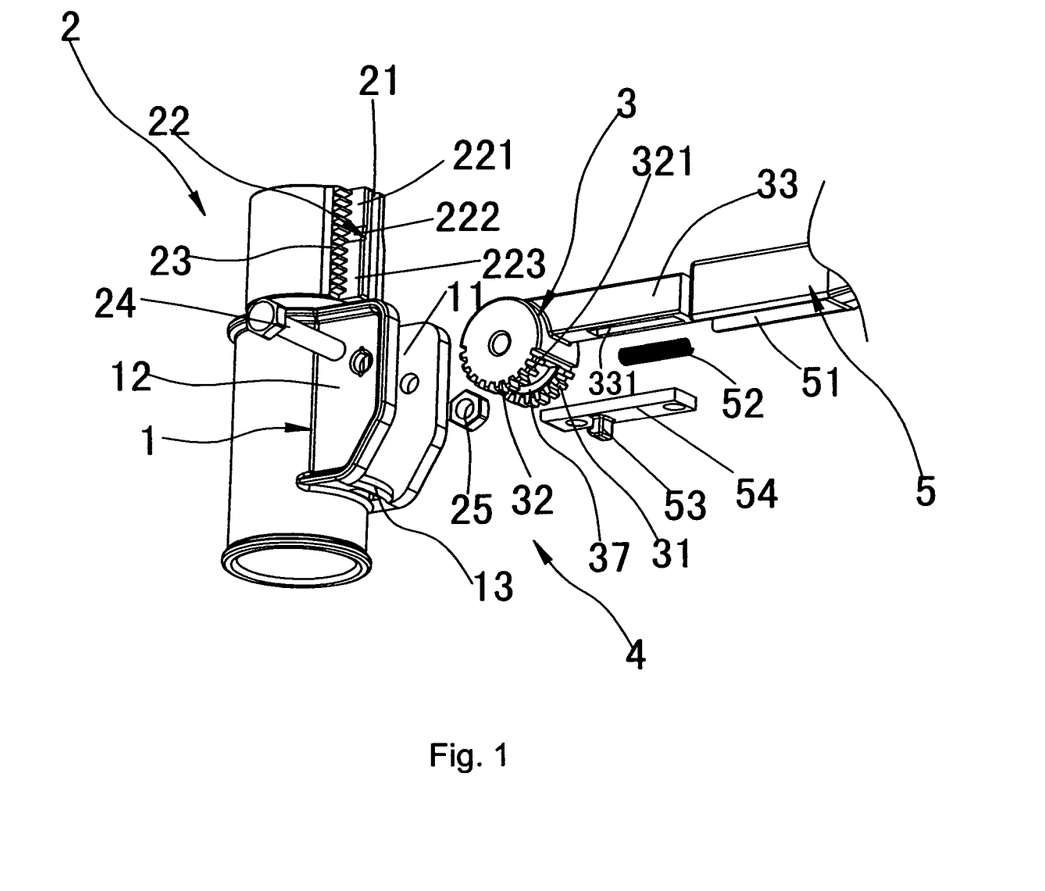
FIG. 1 is a perspective exploded view of an exemplary embodiment of a coupling device for two connecting poles.
Figure 2:
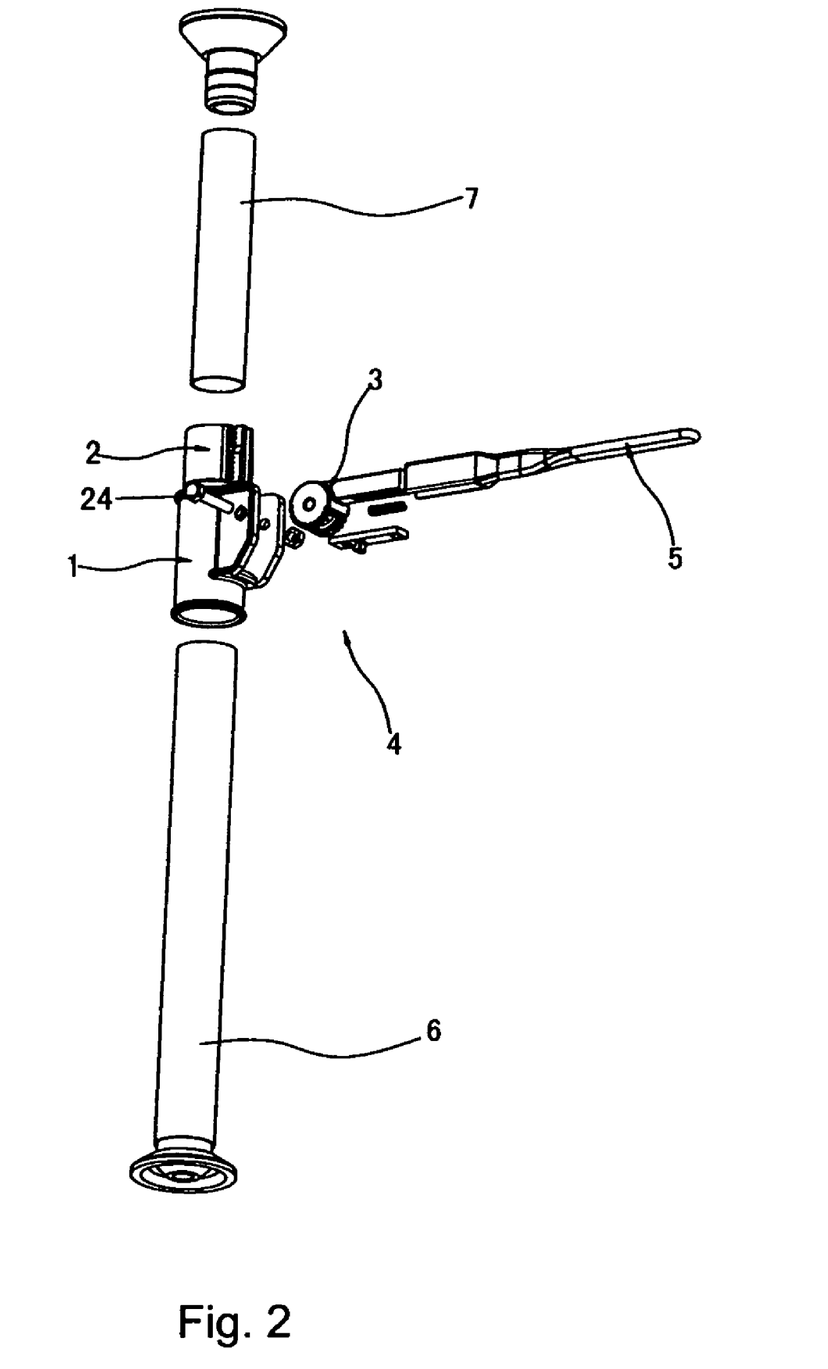
FIG. 2 is a perspective exploded view of the coupling device for two connecting poles shown in FIG. 1, illustrating the coupling device in use.

With reference to FIG. 1, the upper fixing sleeve 2 is sleeved on the upper connecting pole 7 and is secured by the convex ring of the lower fixing sleeve 1. The upper fixing sleeve 2 includes a longitudinal gap 21, both longitudinal edge of the longitudinal gap 21 extend outwards from the outer surface of the upper fixing sleeve 2 forming two fixing plates 22. The fixing plate 22 each includes a releasing portion 221, a locking portion 222 beneath the releasing portion 221 and a raised portion beneath the locking portion 222. The opposing inner surfaces of the two releasing portions 221 are parallel. The locking portion 222 includes an upper end and a lower end. The horizontal distance from the lower end to the gap 21 is bigger than the horizontal distance from the upper end to the gap 21.

The upper fixing sleeve 2 further includes two racks 23 respectively grafted to the outer side surfaces of the two fixing plates 22.

The lower fixing sleeve 1 is sleeved about the upper fixing sleeve 2 whose two fixing plates 22 extend outwards from the open 11 of the lower fixing sleeve 1.

The controlling member 3 includes a central portion 31, two side portions 32 disposed at both side of the central portion 31 and a locking bar 33 in rear of the central portion 31. Among the two side portions 32 and the central portion 31 there forms a space for receiving a portion of the two fixing plates. Both perimeters of the two side portions 32 are of gear teeth. A through groove 331 is disposed through the locking bar 33.

The controlling member 3 is rotatably connected between the two fixed plates 12 by a pin 24 inserted through the two fixed plates 12 and the controlling member 3, and a nut 25 is used to be screwed on the pin 24.

The horizontal distance between the inner side surfaces of the two side portions 32 equals the horizontal distance between the outer side surfaces of the two releasing portions 221, thus the inner side surfaces of the two side portions 32 keep in touch with the outer side surfaces of the two releasing portions 221, futhermore, teeth of the gears 321 of the two side portions can be engaged in the racks 23.

The handle 5 is retractably connected to the locking bar 33. The handle 5 includes a hand grip portion and a connecting portion. The connecting portion includes a locating groove 51 capable of receiving a portion of the locking bar 33. A locating post extends downwards from the inner upper surface of the locating groove 51 and through the through groove 331 of the locking bar 33. In addition, a spring 52 is disposed inside the through groove 331 where between the rear surface of the locating post and the front inner surface of the through groove 331.

The fastening device 4 includes a clip 13 secured between the two fixing plates 12 and a fastener 53 secured to the lower portion of the handle 5. The clip 13 and the fastener 53 match each other.

The fastener 53 is secured on a locating plate 54. The locating plate 54 is secured inside the locating groove 51 by a screw through the locating plate 54 to the locating post and another screw through the locating plate 54 to the upper surface of the locating groove 51.

Figure 4:
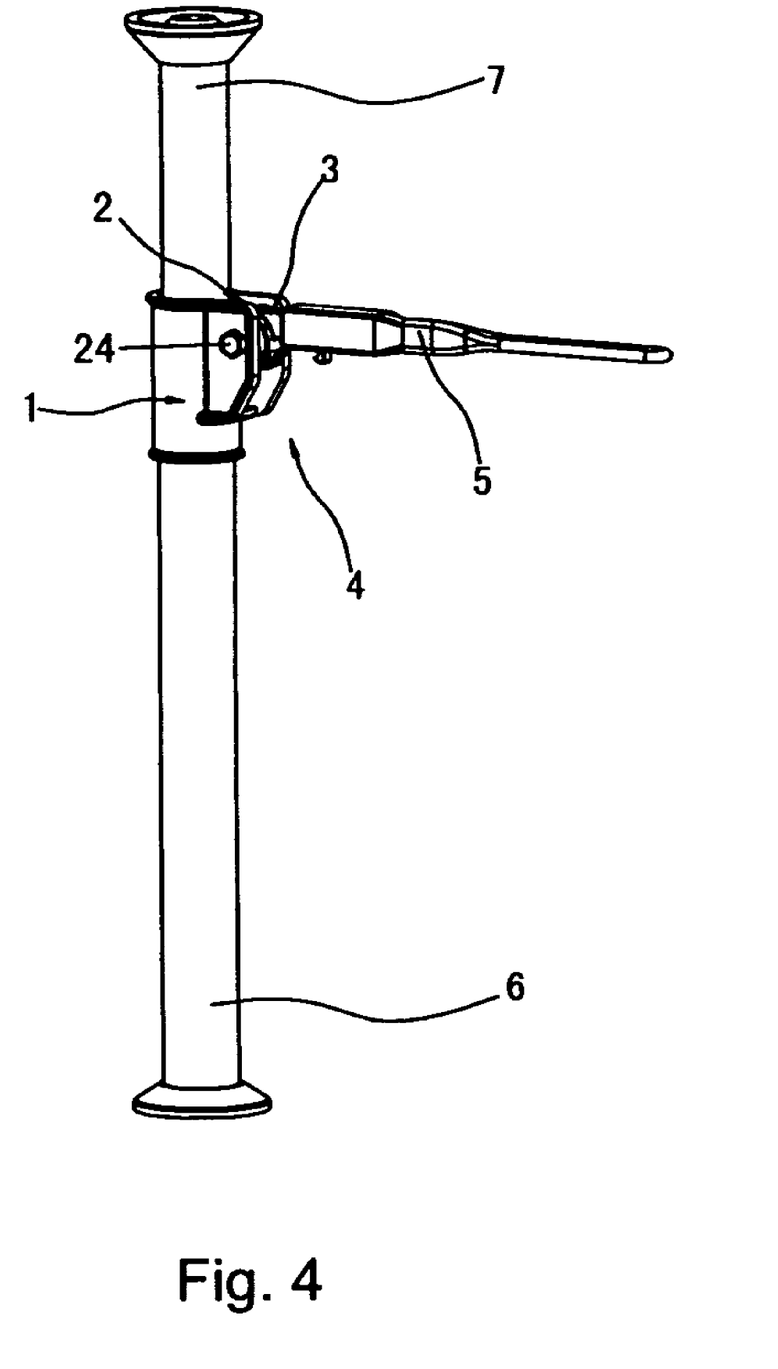
FIG. 4 is a perspective view of the coupling device for two connecting poles shown in FIG. 1, illustrating the coupling device in use.
Figure 5:
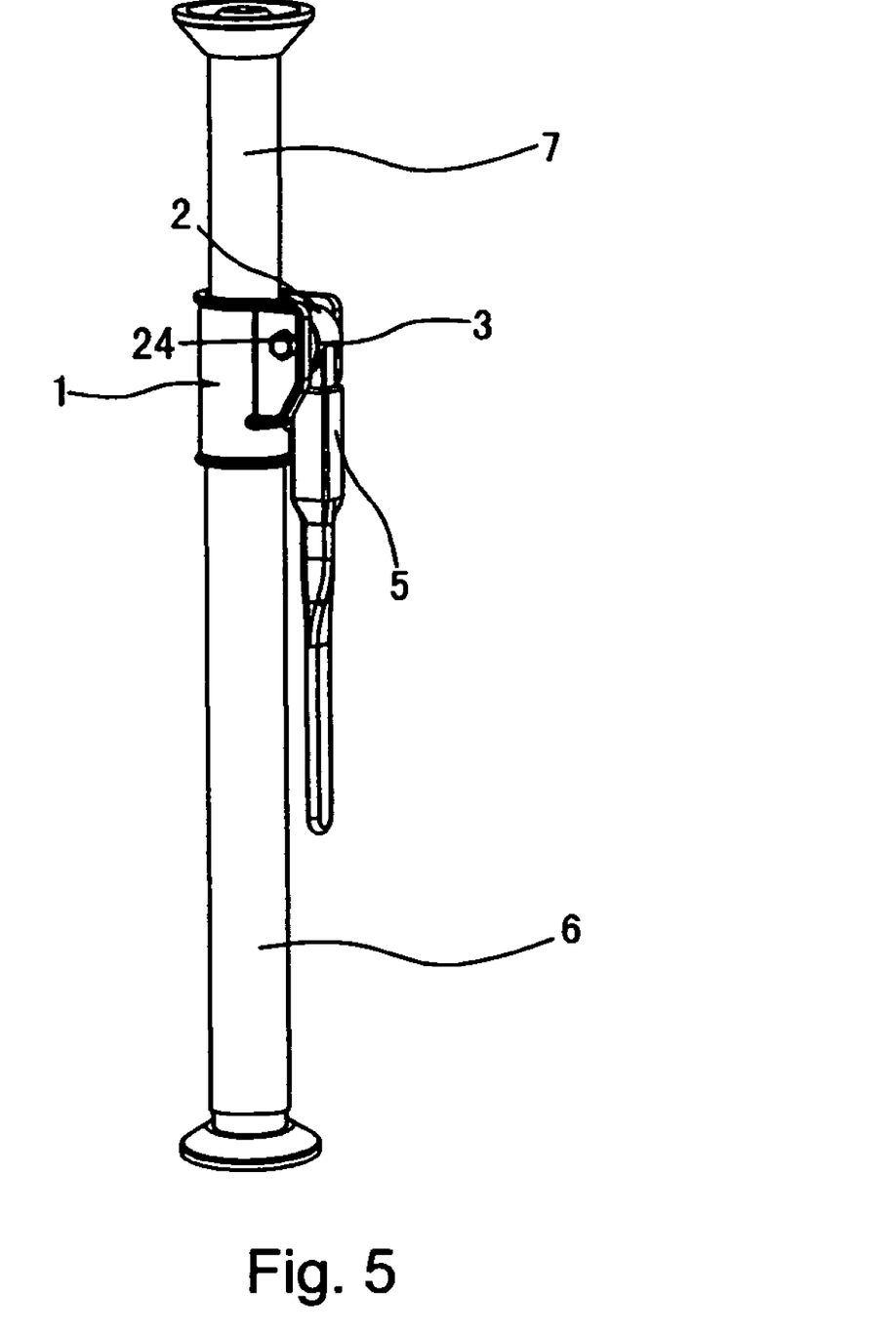
FIG. 5 is a perspective view of the coupling device for two connecting poles shown in FIG. 1, illustrating the coupling device in use.

Steps of securing and adjusting a coupling device are as follow: pulling the upper connecting pole 7 upwards when the handle 5 are in released position or in horizontal position, as FIG. 4 shows; which enables the upper connecting pole 7 to touch the surface of a ceiling; pivoting the handle 5 downwards, as FIG. 5 shows, when this step is proceeding, the upper fixing sleeve 2 slides upwards under the force caused by the coordinate movement of the gears 321 and the racks 23 of the controlling member 3; the two faxing plates 22 of the upper fixing sleeve 2 slides upwards in connection with the upper fixing sleeve 2, thus the locking portions 222 are pressed inwardly by the side portions of the controlling member 3, therefore the longitudinal gap 21 of the upper fixing sleeve 2 becomes smaller; the longitudinal gap 21 of the upper fixing sleeve 2 becomes smaller, which makes the upper fixing sleeve 2 be firmly sleeved on the upper connecting pole 7; continuing rotating the controlling member 3, which drives the gears 321 to rotate and the racks 23 to move upwards so that the upper fixing sleeve 2 drives the upper connecting pole 7 to slide upwards together; then the upper end of the upper connecting pole 7 jacks against the surface of a ceiling and the lower end of the lower connecting pole 6 stands upon a surface; at last, pivoting the handle 5 down right as well as the fastener 53 till the fastener meet and is locked by the clip 13, and then releasing the device, the fastener 53 is firmly locked by the clip 13 under the force of the spring.

Embodiment 2

Figure 6:
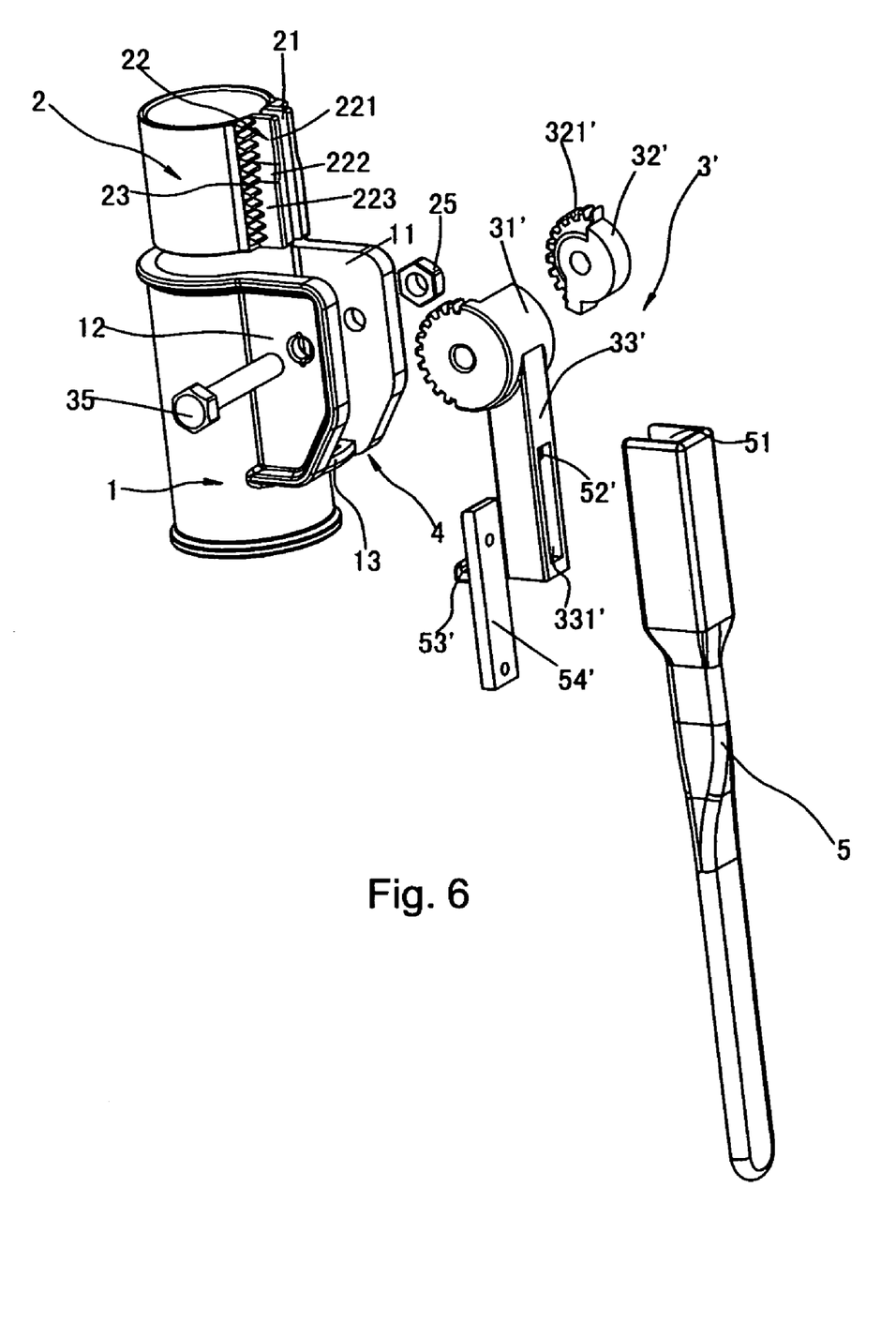
FIG. 6 is a perspective exploded view of another exemplary embodiment of a coupling device for two connecting poles.

With reference to FIG. 5 and 6, in the present embodiment, the width between the two circles of gears of the controlling member is adjustable. Therefore, the controlling member can be adopted on upper connecting poles of different diameters.

Figure 7:
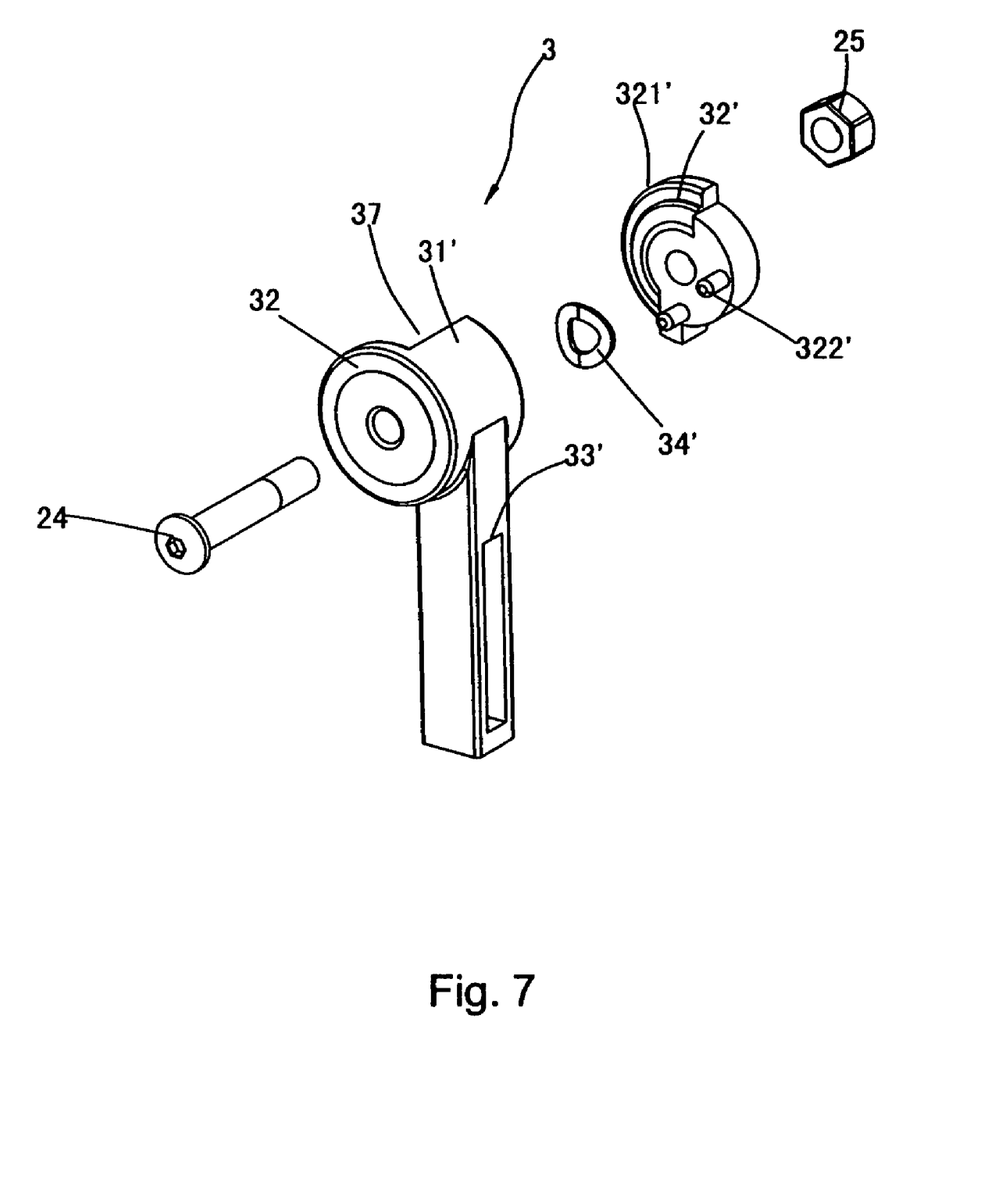
FIG. 7 is a perspective exploded view of the controlling member of the coupling device for two connecting poles shown in FIG. 6.

The controlling member 3 includes a central portion 31', two side portions 32' disposed at both side of the central portion 31', a locking bar 33' in rear of the central portion 31' and a compressed elastic member 34' capable of pulling the side portions 32' to move away from the central portion 31' disposed between the two side portions 32'. Among the two side portions 32' and the central portion 31' there forms a space for receiving a portion of the two fixing plates. Both perimeters of the two side portions 32' are of gear teeth 321'. A first side portion 32' of the two side portions 32' is secured to the central portion 31'; in the middle of the central portion 31' there sets a limiting member which is used to limit a minimum horizontal distance between the two side portions 32', the said minimum horizontal distance between the two side portions 32' equals the horizontal distance between the outer side surfaces of the two releasing portion 221.

The racks 23 of the two fixing plates 2 of the upper fixing sleeve 2 are grafted to the outer side surfaces of the two releasing portions 221, furthermore, teeth of the gears 321' of the two side portions 32' are engaged in the racks 23.

The controlling member 3' is rotatably connected between the two fixed plates 2 by a screw 35' inserted through the two fixed plates 2 and the controlling member 3', and a nut 36' is used to be screwed on the pin 35'. Furthermore, the compressed elastic member 34' is sleeved on the screw 35' and has its two ends jacking against the two side portions 32' so that the two side portions 32' are forced outwards. Here the compressed elastic member 34' is a spring.

The compressed elastic member 34' is an elastic strip. A limiting post 322' is set on the inner side surface of a second side portion 32'. The limiting post 322' is used to limit a minimum horizontal distance between the two side portions 32', the said minimum horizontal distance between the two side portions 32' equals the horizontal distance between the outer side surfaces of the two releasing portion 221.

Because of the compressed elastic member 34' and the adjustable character of the screw 35', the distance between the two gears 321' can be adjusted.

The present invention may be embodied in other specific forms without departing from it sprit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A coupling device for two connecting poles comprising:
    a lower fixing sleeve sleeved on the upper portion of the lower connecting pole, having a through opening communicating with the outer surface and the inner surface of the lower fixing sleeve, two fixed plates extend outwards from the edge of the said opening;
    an upper fixing sleeve sleeved on the lower portion of the upper connecting pole, having a through gap communicating with the outer surface and the inner surface of the upper fixing sleeve, two fixing plates extend outwards from the edge of the said gap, the said fixing plates of the upper fixing sleeve are disposed within the opening of the lower fixing sleeve; the fixing plates including a releasing portion in the top portion and a locking portion beneath the releasing portion, a horizontal distance from the outer side surface of the locking portion to the edge of the gap is bigger than a horizontal distance from the outer side surface of the releasing portion to the edge of the gap;
    a controlling member rotatably connected between the fixed plates of the lower fixing sleeve, including a central portion and two side portions at both sides of the central portion, among the two side portions and the central portion there forms a space for receiving a portion of the two fixing plates, the inner side surfaces of the two side portions keep in touch with the outer side surfaces of the two releasing portions;
    wherein the upper fixing sleeve includes at least one rack grafted to the outer side surfaces of the fixing plates; and
    the perimeters of the two side portions of the controlling member are of gears that match the at least one rack beside the fixing plates.

2. The coupling device for two connecting poles as recited in claim 1, wherein the upper fixing sleeve includes two racks grafted to both outer sides of the two fixing plates.

3. The coupling device for two connecting poles as recited in claim 2, wherein each said fixing plate further includes a raised portion beneath the locking portions.

4. A coupling device for two connecting poles comprising:
    a lower fixing sleeve sleeved on the upper portion of the lower connecting pole, having a through opening communicating with the outer surface and the inner surface of the lower fixing sleeve, two fixed plates extend outwards from the edge of the said opening;
    an upper fixing sleeve sleeved on the lower portion of the upper connecting pole, having a through gap communicating with the outer surface and the inner surface of the upper fixing sleeve, two fixing plates extend outwards from the edge of the said gap, the said fixing plates of the upper fixing sleeve are disposed within the opening of the lower fixing sleeve; the fixing plates including a releasing portion in the top portion and a locking portion beneath the releasing portion, a horizontal distance from the outer side surface of the locking portion to the edge of the gap is bigger than a horizontal distance from the outer side surface of the releasing portion to the edge of the gap;
    a controlling member rotatably connected between the fixed plates of the lower fixing sleeve, including a central portion and two side portions at both sides of the central portion, and a compressed elastic member capable of pulling the side portions to move away from the central portion disposed between the two side portions;
    wherein the upper fixing sleeve includes two racks grafted to both outer sides of the two fixing plates; and
    the perimeters of the two side portions of the controlling member are of gears that match the said two racks.

* * * * *